(12) United States Patent
Gotou et al.

(10) Patent No.: US 8,060,230 B2
(45) Date of Patent: Nov. 15, 2011

(54) SYSTEM FOR SYNCHRONIZING PART DESIGN AND DIE DESIGN, SERVER, PART DESIGN TERMINAL APPARATUS AND DIE DESIGN TERMINAL APPARATUS USED THEREFOR

(75) Inventors: Hiroki Gotou, Kosai (JP); Shuuji Ono, Kosai (JP); Shinji Tsuchiya, Kosai (JP); Tetsuhiro Hattori, Makinohara (JP)

(73) Assignee: Yazaki Corporation, Tokyo (JP)

( * ) Notice: Subject to any disclaimer, the term of this patent is extended or adjusted under 35 U.S.C. 154(b) by 254 days.

(21) Appl. No.: 11/720,652

(22) PCT Filed: Dec. 1, 2005

(86) PCT No.: PCT/JP2005/022105
§ 371 (c)(1),
(2), (4) Date: Jun. 30, 2009

(87) PCT Pub. No.: WO2006/059689
PCT Pub. Date: Jun. 8, 2006

(65) Prior Publication Data
US 2009/0281648 A1   Nov. 12, 2009

(30) Foreign Application Priority Data
Dec. 1, 2004  (JP) .................. P2004-348133

(51) Int. Cl.
*G06F 19/00* (2011.01)
(52) U.S. Cl. .................... 700/98; 700/31; 700/118

(58) Field of Classification Search .................... 700/29, 700/97, 98, 31, 95, 118, 121
See application file for complete search history.

(56) References Cited

U.S. PATENT DOCUMENTS

| 6,560,499 B1 * | 5/2003 | Demmer ................ 700/97 |
| 6,701,200 B1 | 3/2004 | Lukis et al. |
| 2004/0193298 A1 * | 9/2004 | Yamada et al. ......... 700/98 |
| 2006/0155407 A1 * | 7/2006 | Azuma ................. 700/105 |

FOREIGN PATENT DOCUMENTS

| JP | 10-334127 A | 12/1998 |
| JP | 11-175583 A | 7/1999 |
| JP | 2002-321225 A | 11/2002 |
| JP | 2003-181842 A | 7/2003 |
| JP | 2004-272327 A | 9/2004 |

OTHER PUBLICATIONS

Japanese Office Action issued Oct. 29, 2010, in Application No. 2004-348133.
Extended European Search Report issued Sep. 1, 2011, in corresponding Application No. 05811269.9.

(Continued)

*Primary Examiner* — Kakali Chaki
*Assistant Examiner* — Nathan Laughlin
(74) *Attorney, Agent, or Firm* — Sughrue Mion, PLLC

(57) ABSTRACT

Information with regard to each finished part model is transmitted from a part design terminal 1 to an exclusive server 3 at each time of finishing each part model formed in steps for designing a part. Further, the information with regard to the each part model is acquired by making access to the exclusive server 3 from a die design terminal 2. Therefore, tasks with regard to designing the die can be progressed in parallel based on the acquired information without awaiting for finishing all of the respective part models for designing the die.

12 Claims, 6 Drawing Sheets

OTHER PUBLICATIONS

Yuh-min Chen; "Development of a computer-aided Concurrent Net Shape Product and Process Development Environment"; Robotics & Computer-Integrated Manufacturing; 1997; vol. 13 No. 4. pp. 337-360.

Jianguo Wang, et al.; "Domain-specific portal for the precision component and tooling industry in Singapore-needs analysis and a testbed implementation"; Robotics and Computer Integrated Manufacturing; 2003; vol. 19 pp. 479-491.

* cited by examiner

US 8,060,230 B2

SYSTEM FOR SYNCHRONIZING PART DESIGN AND DIE DESIGN, SERVER, PART DESIGN TERMINAL APPARATUS AND DIE DESIGN TERMINAL APPARATUS USED THEREFOR

TECHNICAL FIELD

The present invention relates to a system for synchronizing a task of designing a predetermined part and a task of designing a die in correspondence with the part as well as an exclusive server and exclusive terminal apparatus used therefor.

BACKGROUND ART

Normally, a resin-made part such as a connector or a clip for a wire harness is molded by utilizing a die in correspondence with the part. FIG. 7 is a diagram showing a basic task flow with regard to related molding parts.

As shown in FIG. 7, first, a part design department executes advance investigation, preparation while integrating design drawings provided from a part ordering company of a car maker or the like, or forming an extremely outline outer shape model (task stage T91). Next, the part design department successively forms models of a base cover model, a base model, a cover model and the like and finally forms a detailed model of a shape substantially equivalent to that of a molded part expressing a lock claw, a pin hole, a marking shape, an inner side face roundness shape and the like (task stage T92).

Next, a die design department receives the detailed model from the part design department (may receive a model other than the detailed model), and forms a specification, a concept drawing of a die and a die dividing drawing (task stage T93). The specification of the die is a document described with a design intension, a required function and the like of part design. Further, the specification of the die is also described with a product condition which cannot be described on other drawing. Further, the concept drawing of the die is a drawing described with disassembling the designed die into a plurality of metal parts and assembling thereof based on a product model. The die design department executes an outline design of a die by selecting a die material or a mold base, or selects a machine, for example, in reference to the specification and the concept drawing and finally forms a die dividing drawing in correspondence with a finished part.

Further, when a problem regarding the above respective selection or the die design or the like is posed at the die design department, the die design department submits a request for solving the problem to the pail design department. Further, the part design department modifies the model in accordance with the request and deliver to the die design department again. The submission of the request and the modify of the model is repeatedly by a number of times until all of the problems are resolved.

Further, after various arrangements or NC program forming are executed based on the prepared die dividing drawing, at a fabrication department, machining of electrical discharge machining, NC machining or the like of a die is executed (task stage T94), part forming is executed (task stage T95), thereafter, evaluation or delivery is executed (task stage T96).

Further, there is information of technical references related to the invention of the application as follows.
Patent Reference 1: JP-A-10-334127
Patent Reference 2: JP-A-11-175583
Patent Reference 3: JP-A-2003-181842

DISCLOSURE OF THE INVENTION

Problems that the Invention is to Solve

However, according to the flow of tasks related to each other, the task of designing a predetermined part and the task of designing a die in correspondence with the part are connected in series. Therefore, until a detailed model is finished at the part design department at task stage T92, at the task design department, the task related to the die design cannot be executed by proceeding to task stage T93.

Further, task stage T92 executed at the part design department first, the detailed model is formed without taking a condition of die design at the die design department into consideration. Therefore, a request for reconsidering the model is frequently brought about from the die design department to the part design department. Further, even at task stage T92 executed after receiving the request, at the part design department, the detailed model is formed after forming respective models at respective times to be delivered to the die design department. Therefore, a task efficiency is deteriorated by such reprocessed task.

Therefore, in view of the above-described current state it is a problem of the invention to provide a system capable of promoting a task efficiency by synchronizing a part design task and a die design task, as well as an exclusive server and an exclusive terminal used therefor.

A system of synchronizing a part design and a die design of a first mode carried out for resolving the above-described problem is a system for synchronizing a task of designing a predetermined part and a task of designing a die in correspondence with the part, including a part design terminal 1 arranged for designing the part, a die design terminal 2 arranged for designing the die, and an exclusive server 3 communicated and connected to the two terminals, wherein the part design terminal 1 includes a part model information transmitting portion 1A for transmitting information with regard to each finished part model respectively to the exclusive server 3 at each time of finishing the part model formed in steps for designing the part, and the die design terminal 2 includes a part model information acquiring portion 2A for acquiring the information with regard to the each part model by making access to the exclusive server 3 as shown in FIG. 1.

According to the first mode of the invention, at each time of finishing each part model formed in steps for designing the part, the information with regard to each finished part model is transmitted from the part design terminal 1 to the exclusive server 3. Further, information with regard to each part model is acquired from the die design terminal 2 by making access to the exclusive server 3. Therefore, tasks with regard to designing the die can be progressed in parallel based on the acquired information without awaiting for finishing all of the respective part models for designing the die.

As shown in FIG. 1, a synchronizing system of a part design and a die design of a second mode carried out for resolving the above-described problem is characterized in that the part model information transmitting portion 1A includes a first part model information transmitting portion for transmitting information with regard to a first part model necessary at a stage of forming a specification of the die as information with regard to the respective part models, a second part model information transmitting portion for transmitting information with regard to a second part model necessary at a stage of forming a concept drawing of the die as information with regard to the respective part models, and a third part model information transmitting portion for transmitting information with regard to a third part model necessary at a stage of forming a die dividing drawing of the die as information with regard to the respective part models in the synchronizing system of the first mode.

According to the second mode of the invention, the specification of the die can be formed by acquiring the information with regard to the first part mode by making access to the exclusive server 3 from the die design terminal 2. Further, the concept drawing of the die can be formed by acquiring the information with regard to the second part model by making access to the exclusive server 3 from the die design terminal 2. Further, the die dividing drawing of the die can be formed by acquiring the information with regard to the third part model by making access to the exclusive server 3 from the die design terminal 2. That is, forming the specification of the die, forming the concept drawing, forming the die dividing drawing can be progressed without awaiting for finishing all of the respective part models for designing the die.

A third mode of a system of synchronizing a part design and a die design carried out for resolving the above-described problem is characterized in that the die design terminal 2 further includes a request transmitting portion 2B for transmitting a request for the first part model, the second part model or the third part model to the part design terminal 1 by way of the exclusive server 3 or directly by way of a predetermined communication network, and the part design terminal 1 further includes a request receiving portion 1B for receiving the request by making access to the exclusive server 3 or directly by way of the communication network in the synchronizing system of the second mode as shown in FIG. 1.

According to the third mode, the request for the respective part models is transmitted from the die design terminal 2 to the part design terminal 1 by way of the exclusive server 3 or directly. Further, the request is received by making access to the exclusive server 3 from the part design terminal 1 or directly. Therefore, in designing the part, the respective part models can be modified by instantly inputting the request with regard to designing the die.

An exclusive server used for a system of synchronizing a part design and a die design of a fourth mode carried out in order to resolve the above-described problem is an exclusive server used for synchronizing a task of designing a predetermined part and a task of designing a die in correspondence with the part, characterized in that the exclusive server is communicated and connected with a part design terminal arranged for designing the part and a die design terminal arranged for designing the die, including a receiving portion for respectively receiving information with regard to each finished part model transmitted from the part design terminal at each time of finishing the part model formed in steps for designing the part, a storing portion for respectively storing the information with regard to the each part model, and a transmitting portion for reading the information with regard to the each part model to be transmitted to the die design terminal in response to the access from the die design terminal.

According to the fourth mode, the information with regard to each finished part model is transmitted at each time of finishing the each part model formed in steps for designing the part from the part design terminal to the exclusive server. Further, the information with regard to each part model is acquired by making access to the exclusive server from the die design terminal. Therefore, the tasks with regard to the die design can be progressed in parallel based on the acquired information without awaiting for finishing all of the respective part models.

A part design terminal apparatus used for a system of synchronizing a part design and a die design of a fifth mode carried out in order to resolve the above-described problem is a terminal apparatus arranged for the part design used for synchronizing a task of designing a predetermined part and a task of designing a die in correspondence with the part and is characterized in including a transmitting portion for respectively forming information with regard to each finished part model at each time of finishing the part model formed in steps for designing the part and transmitting the information to a side of a die design terminal.

According to the fifth mode, the terminal apparatus arranged for designing the part respectively forms the information with regard to each finished part model to a side of the die design terminal at each time of finishing the part model formed in steps for designing the part to transmit the side of the die design terminal. Therefore, the tasks with regard to design the die can be progressed in parallel based on the acquired information without awaiting for finishing all of the respective models for designing the die.

A die design terminal apparatus used for a system of synchronizing a part design and a die design of a sixth mode carried out in order to resolve the above-described problem is a terminal apparatus arranged for the die design used for synchronizing a task of designing a predetermined part and a task of designing a die in correspondence with the part, characterized in including an acquiring portion for acquiring information with regard to each finished part model formed on a side of a part design terminal at each time of finishing the part model formed in steps for designing the part.

According to the sixth mode, the terminal apparatus arranged for designing the die acquires the information with regard to each finished part model formed on the side of the part design terminal at each time of finishing the part model formed in steps for designing the part. Therefore, the tasks with regard to the die design can be progressed in parallel based on the acquired information without awaiting for finishing all of the respective part models.

According to the first mode, the information with regard to each finished part model is transmitted from the part design terminal 1 to the exclusive server 3 at each time of finishing each part model formed in steps for designing the part. Further, the information with regard to each part model is acquired by making access to the exclusive server 3 from the die design terminal 2. Therefore, the tasks with regard to design the die can be progressed in parallel based on the acquired information without awaiting for finishing all of the respective part models for designing the die. Therefore, the part design task and the die design task are synchronized to promote a task efficiency.

According to the second mode, the specification of the die can be formed by acquiring the information with regard to the first part model by making access to the exclusive server 3 from the die design terminal 2. Further, the concept drawing of the die can be formed by acquiring information with regard to the second part model by making access to the exclusive server 3 from the die design terminal 2. Further, the die dividing drawing of the die can be formed by acquiring the information with regard to the third part model by making access to the exclusive server 3 from the die design terminal 2. That is, forming the specification of the die, forming the concept drawing, forming the die dividing drawing can be progressed without awaiting for finishing all of the respective part models for designing the die. Therefore, the part design task and the die design task are synchronized to promote the task efficiency.

According to the third mode, a request for each part model is transmitted from the die design terminal 2 to the part design terminal 1 by way of the exclusive server 3 or directly Further, the request is received by making access to the exclusive server 3 from the part design terminal 1 or directly. Therefore, the respective part models can be modified by instantly inputting the request with regard to the die design in designing the part. Therefore, the task efficiency is further promoted.

According to the fourth mode, at each time of finishing each part model formed in steps for designing the part, the information with regard to each finished part model is transmitted from the part design terminal to the exclusive server. Further, the information with regard to each part model is acquired by making access to the exclusive server from the die design terminal. Therefore, the tasks with regard to design the die can be progressed in parallel based on the acquired information without awaiting for finishing all of the part modes for designing the die. Therefore, the part design task and the die design task are synchronized to promote the task efficiency.

According to the fifth mode, the terminal apparatus arranged for designing the part respectively forms the information with regard to each finished part model at each time of finishing the part model formed in steps for designing the part to transmit to the side of the die design terminal. Therefore, the tasks with regard to designing the die can be progressed in parallel based on the acquired information without awaiting for finishing all of the respective part models for designing the die. Therefore, the part design task and the die design task are synchronized to promote the task efficiency.

According to the sixth mode, the terminal apparatus arranged for the die design acquires information with regard to each finished part model formed on the side of the part design terminal at each time of finishing the part model formed in steps for designing the part. Therefore, the tasks with regard to design the die can be progressed in parallel based on the acquired information without awaiting for finishing all of the respective part models for designing the die. Therefore, the part design task and the die design task are synchronized to promote the task efficiency.

DESCRIPTION OF REFERENCE NUMERALS AND SIGNS

Figure 1:
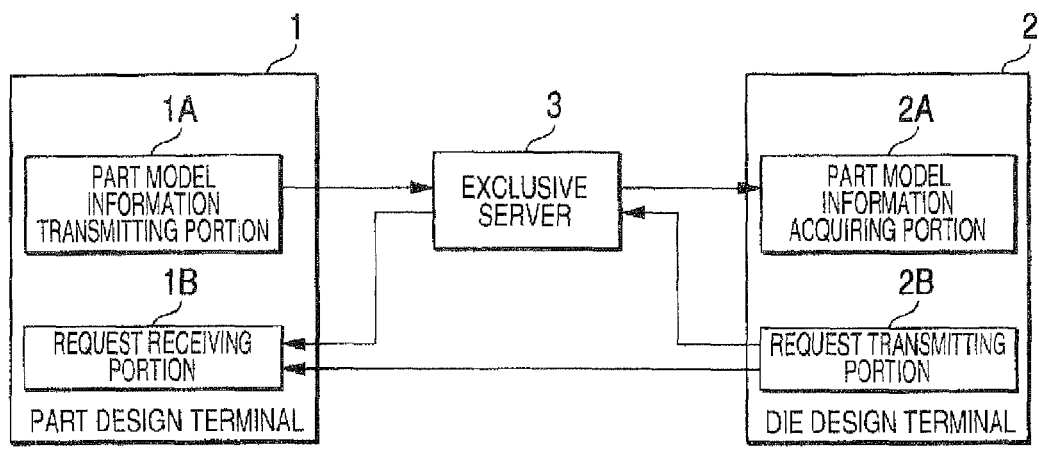
FIG. 1 is a block diagram showing a basic constitution of a system of synchronizing a part design and a die design of the invention.

1 part design terminal
2 die design terminal
3 exclusive server
4 network
101 microcomputer
102 input portion
103 display portion
104 printing portion
105 storing portion
106 communication interface

BEST MODE FOR CARRYING OUT THE INVENTION

Figure 2:
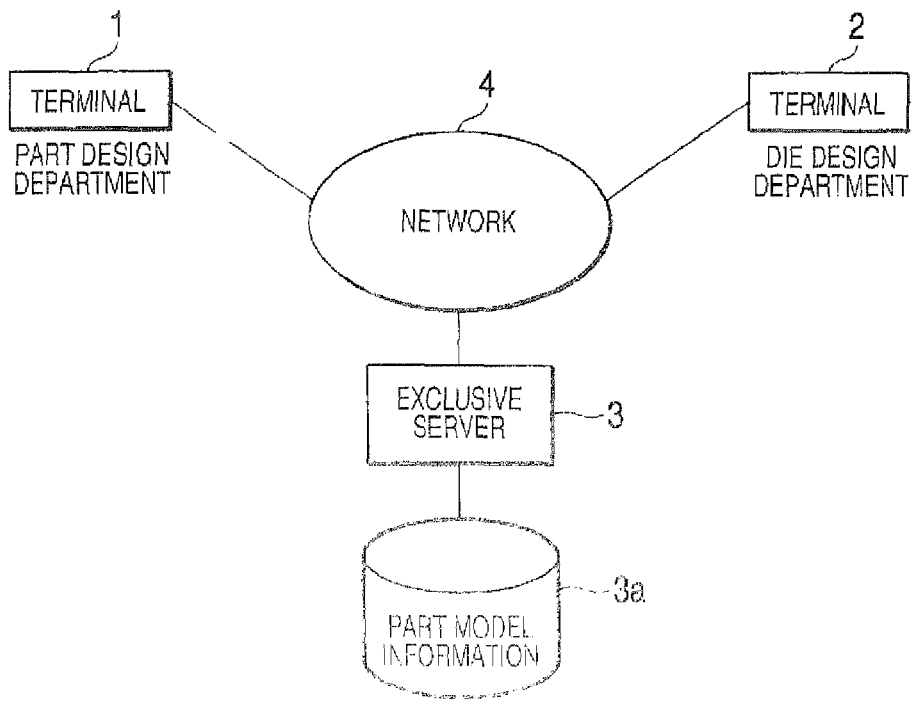
FIG. 2 is a block diagram showing a system constitution according to am embodiment of the invention.
Figure 3:
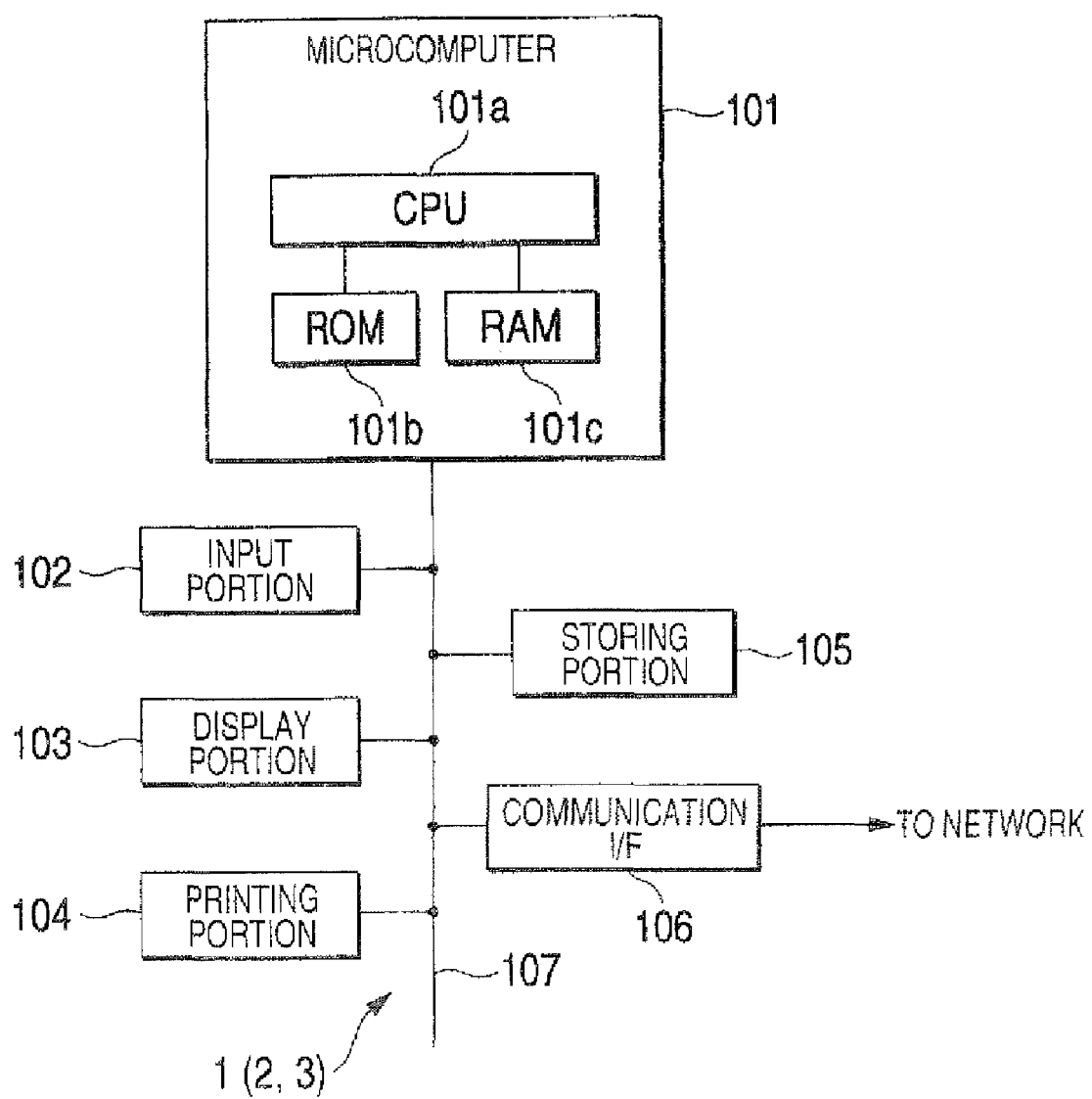
FIG. 3 is a block diagram showing a constitution of respective terminals and an exclusive server in FIG. 2.

An embodiment of the invention will be explained in reference to the drawings as follows. First, an explanation will be given of a hardware constitution used in the embodiment of the invention in reference to FIG. 2 and FIG. 3. FIG. 2 is a block diagram showing a system constitution according to the embodiment of the invention. FIG. 3 is a block diagram showing a constitution of respective terminals and an exclusive server in FIG. 2.

As shown in FIG. 2, normally, the system includes the part design terminal 1 provided for designing a part at a part design department, the die design terminal 2 arranged for designing a die at a die design department, and the exclusive server 3 communicated and connected with the two terminals 1, 2 The part design department designs a resin-made part such as a connector or a clip for a wire harness. The die design department designs a die in correspondence with the part. Further, although according to the embodiment, the part design terminal 1 is arranged at the part design department and the die design terminal 2 is arranged at the die design department, according to the invention, a relationship between the departments and arrangements of the terminals is not limited. For example, the part design terminal 1 may be arranged at a part which is not referred to as the part design department (for example, development department). In sum, according to the invention, the part design terminal 1 may be a terminal for a task of designing a part, the die design terminal 2 may be a terminal for a task of designing a die, and departments arranged with the respective terminals are not specified.

The part design terminal 1, the die design terminal 2 and the exclusive server 3 are connected each other by the network 4. The network 4 is an exclusive network of LAN or the like or the internet. Although single pieces of the terminals 1, 2 are respectively shown, plural pieces thereof may be provided. At least part model information Sa is stored at the exclusive server 3.

The part model information 3a is constituted by information with regard to a first part model (also simply referred to as first part model information) necessary at a stage of forming a specification of a die at the die design department, information with regard to a second part model (also simply referred to as second part model information) necessary at a stage of forming a concept drawing of a die at the die design department, information with regard to a third part model (also simply referred to as third part model information) necessary at a stage of forming a die dividing drawing of a die at the die design department. Further, actually, the first through the third part model information are respectively electronic information in correspondence with the first through the third part models designed in 3D by CAD.

Figure 4A:
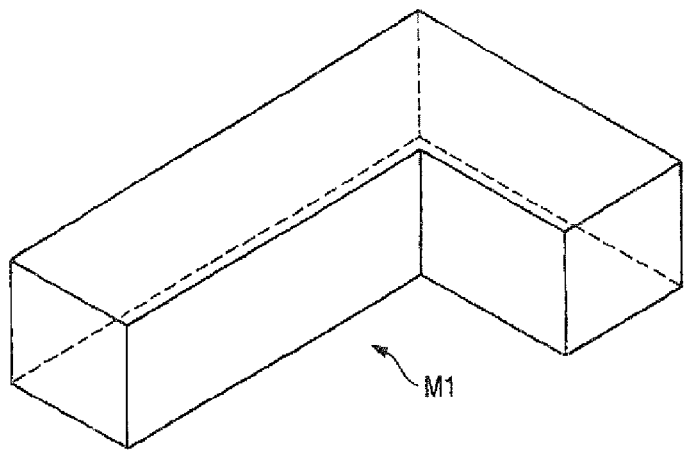
FIG. 4(A) and FIG. 4(B) are perspective views exemplifying respective part models according to the embodiment of the invention.
Figure 4B:
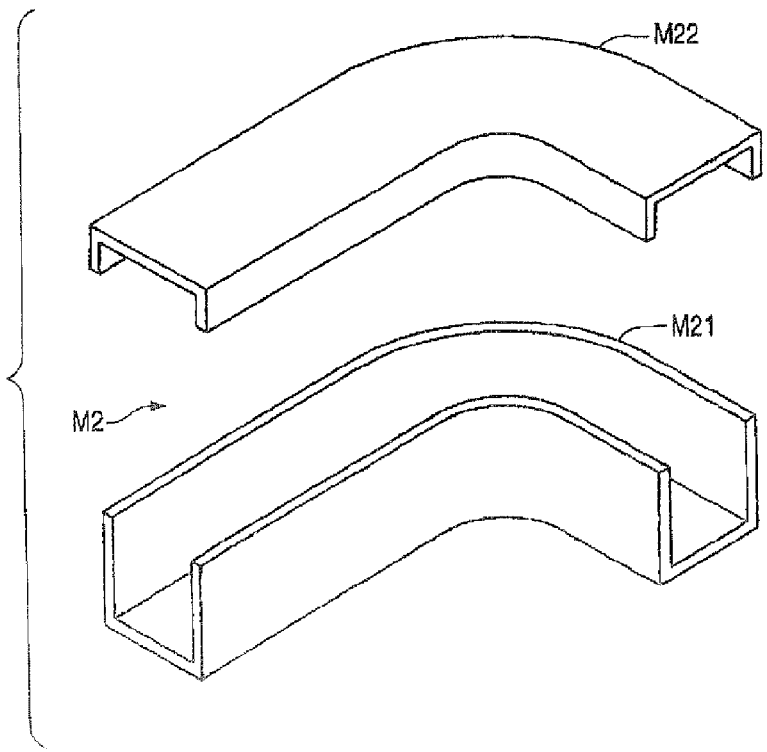

The first part model becomes necessary at the stage of forming the specification of a die and is a master model by which a maximum value (including a projection or the like) of a finished product can be grasped as shown in For example, M1 of FIG. 4(A). The model is useful particularly for selecting a die material or a mold base at the stage of forming the specification. Further, the second part model becomes necessary at the stage of forming a concept drawing of a die and is a divided model divided into a cover portion M21 and a base portion M22 as shown in For example, M2 of FIG. 4(B). The model is integrated with also information of thicknesses or dimensions, outer side face roundness shapes and the like of respective portions. The model is particularly useful for selecting a standard die part, selecting a standard slide body, selecting a machine and the like at the stage of forming the concept drawing. Further, the third part model becomes necessary at the stage of forming a die divided drawing of a die and is a detailed model in correspondence with a finished product added with information of a lock claw, a pin hole, a marking shape, an inner side face roundness shape and the like, not illustrated, for, for example, a model indicated by M2 of FIG. 4(B).

As shown in FIG. 3, all of the part design terminal 1, the die design terminal 2, and the exclusive server 3 are realized by a well-known computer which basically includes the microcomputer 101, the input portion 102, the display portion 103, the printing portion 104, the storing portion 105, and the communication interface 106.

As shown in FIG. 3, the microcomputer 101 includes CPU 101a (central processing unit), ROM 101b for storing a boot program or the like, RAM 101c for temporarily storing results of various processings. The input portion 102 is a key board, a mouse or the like for inputting the above-described various values or the like, the display portion 103 is CRT or the like for displaying results of processings, the printing portion 104 is a printer for printing results of processings. Further, the storing portion 105 is a hard disk drive for storing various data bases or results of processings. When applying to the exclusive server 3, the storing portion 105 stores the part model information 3a. The communication interface 106 is a modem board or the like connected to the network 4 for executing data communication with other apparatus or other terminal. The constituent elements are connected by an inner bus 107. CPU 101a is started in accordance with a boot program stored to ROM 101b and is operated in accordance with an application program showing a processing procedure according to the invention.

Figure 5:
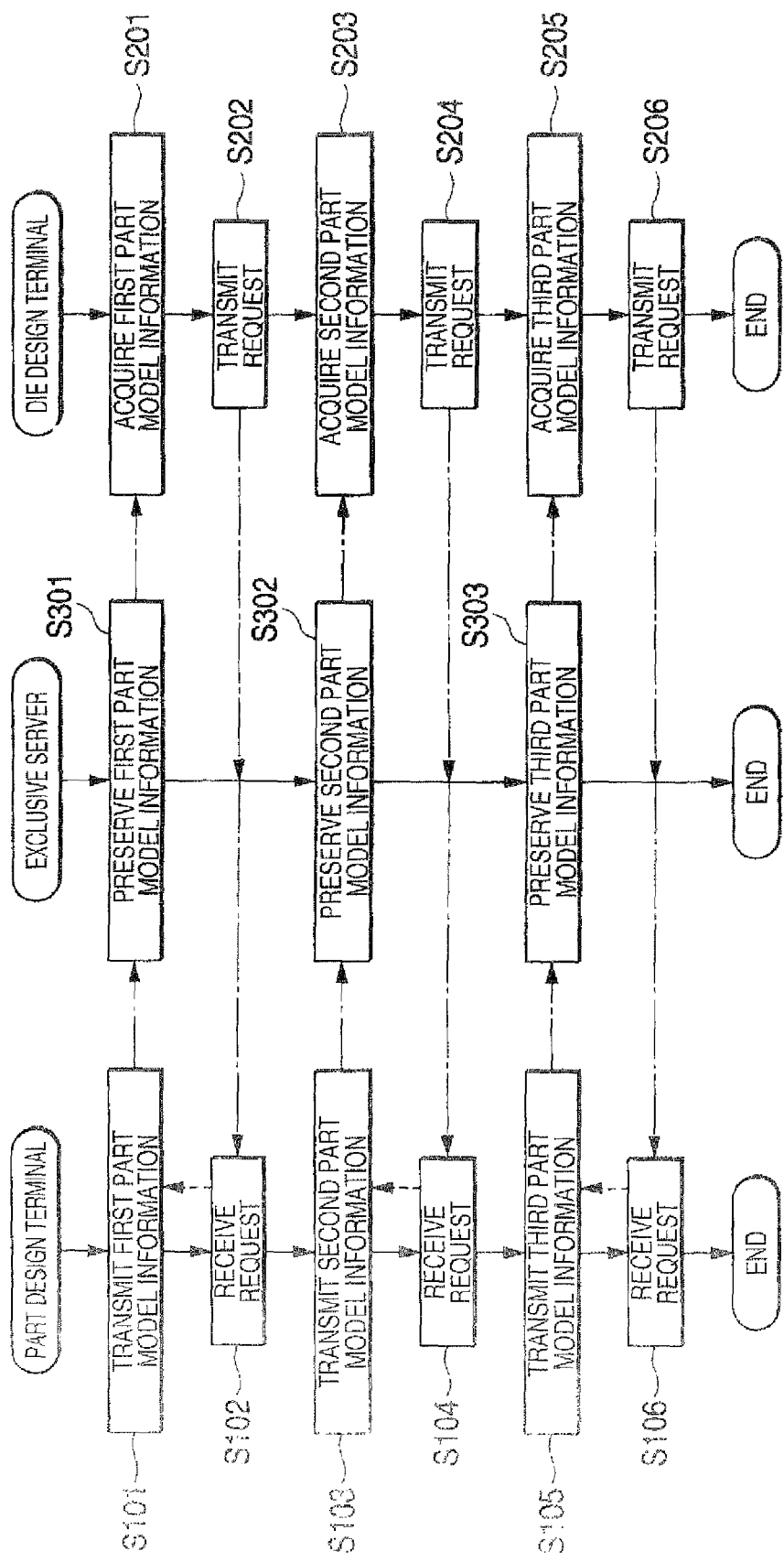
FIG. 5 is a flowchart showing a processing procedure according to the embodiment of the invention.
Figure 6:
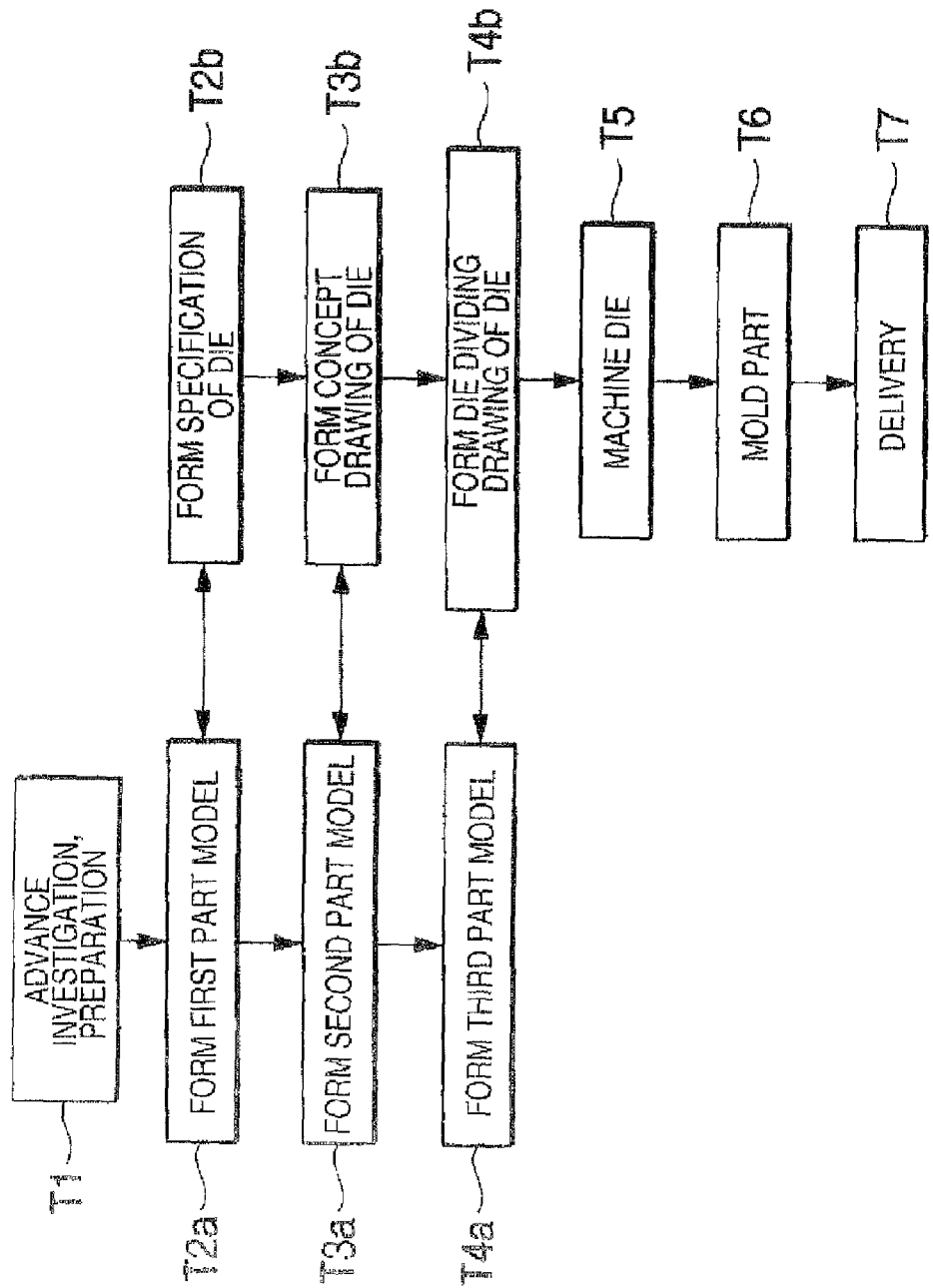
FIG. 6 is a diagram showing a task flow capable of being executed by the embodiment of the invention.
Figure 7:
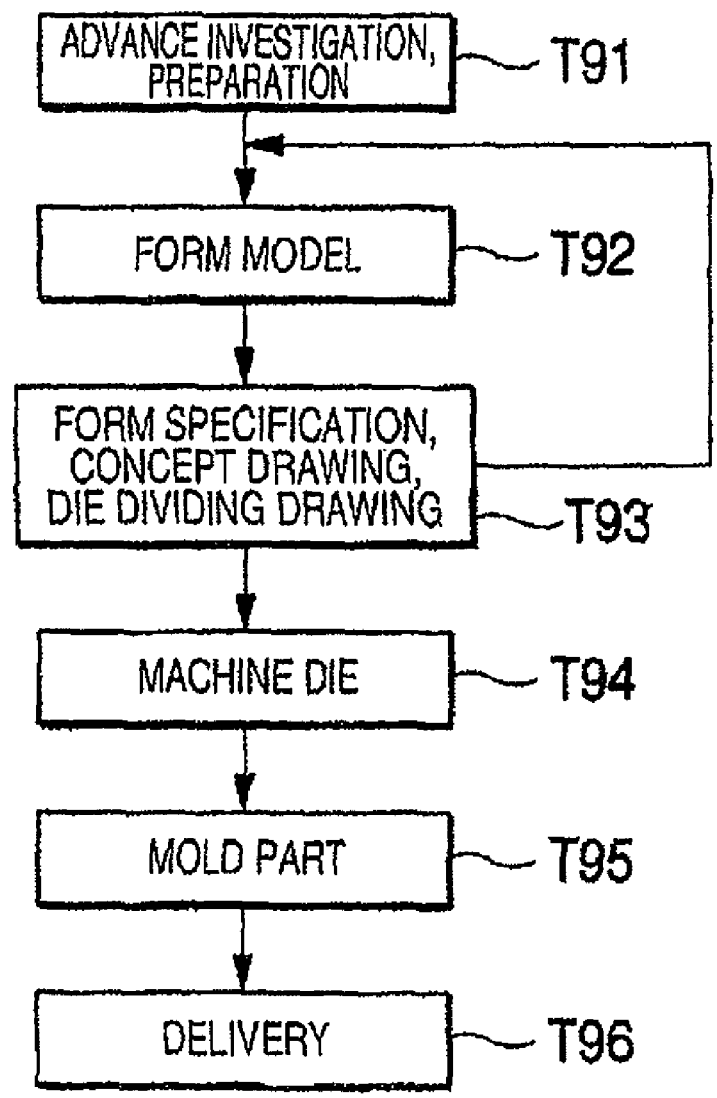
FIG. 7 is a diagram showing a basic task flow with regard to forming related parts.

Successively, an explanation will be given of a processing procedure according to the embodiment of the invention by using FIG. 5 in reference to FIG. 6. FIG. 5 is a flowchart showing a processing procedure according to the embodiment of the invention. FIG. 6 is a diagram showing a task flow capable of being executed by the embodiment of the invention.

As shown in FIG. 6, first, a part design department executes advance investigation, preparation (task stage T1). When a supplementary explanation is given, at the stage, design drawings provided from a part ordering company to the part design department are integrated, or an extremely outline outer shape model is formed. Next, the part design department forms a first part model on CAD (task stage T2a).

After finishing the task stage T2a, as shown in FIG. 5, the part design terminal 1 transmits first part model information constituting electronic information with regard to a first part model in response to a predetermined operation (processing step S101). The exclusive server 3 preserves the first part model information (processing step S301). Further, the die design terminal 2 makes access to the exclusive server 3 and acquires the first part model information in response to a predetermined operation (processing step S201).

Next, as shown in FIG. 6, the die design department forms a specification of a die based on the acquired first part model information (task stage T2b). Here, when there is a request for the first part model, the die design department picks up the request in reference to the acquired first part model information.

In accordance therewith, in FIG. 6, the die design terminal 2 directly transmits the request to the part design terminal 1 through the exclusive server 3 or a network of the internet or the like in response to a predetermined operation (processing step S202). Further, the part design terminal 1 receives the request (processing step S102). Further, when the first part information is changed as a result of receiving the request, the part designing terminal 1 may execute the processing step S101 again. Further, when there is no request the processing step S202 and the processing step S102 are skipped.

Next, as shown in FIG. 6, the part design department forms a second part model on CAD (task stage T3a).

After finishing the task stage T3a, as shown in FIG. 5, the part design terminal 1 transmits second part model information which is electronic information with regard to a second part model to the exclusive server 3 in response to a predetermined operation (processing step S103). The exclusive server stores the second model information (processing step S302). Further, the die design terminal 2 accesses to the exclusive server 3 and acquires the second part model information in response to a predetermined operation (processing step S203).

Next, as shown in FIG. 6, the die design department forms a concept drawing of a die based on the acquire second part model information (task stage T3b). Here, when there is a request for the second part model, the die design department picks up the request in reference to the acquired second part model information.

In accordance therewith, in FIG. 5, the die design terminal 2 directly transmits the request to the part design terminal 1 through the exclusive server 3 or the internet or the like in response to a predetermined operation (processing step S204). Further, the part design terminal 1 receives the request (processing step S104). Further, when the second part information is changed as a result of receiving the request, the part design terminal 1 may execute the processing step S103 again. Further, when there is no request, the processing step S204 and the processing unit S104 are skipped.

Next, as shown in FIG. 6, the part design department forms a third part model on CAD (task stage T4a).

After finishing the task stage T4a, as shown in FIG. 5, the part design terminal 1 transmits third part model information which is electronic information with regard to the third part model to the exclusive server 3 in response to a predetermined operation (processing step S105). The exclusive server 3 stores the third part model information (processing step S303). Further, the die design terminal 2 accesses to the exclusive server 3 and acquires the third part model information in response to a predetermined operation (processing step S205).

Next, as shown in FIG. 6, the die design department forms a die dividing drawing of a die based on the acquired third part model information (task stage T4b). Here, when there is a request for the third part model, the die design department picks up the request in reference to the acquired third part model information.

In accordance therewith, in FIG. 5, the die design terminal 2 directly transmits the request to the part design terminal 1 through the exclusive server 3 or the internet or the like in response to a predetermined operation (processing step S206). Further, the part design terminal 1 receives the request (processing step S206). Further, when the third part information is changed as a result of receiving the request, the part design terminal 1 may execute the processing step S105 again. Further, when there is no request, the processing step S206 and the processing step S106 are skipped.

Further, after executing various arrangements or NC program forming based on the formed die dividing drawing, as shown in FIG. 6, die machining of electric discharge machining, NC machining or the like is executed (task stage T5), after forming a part (task stage T6), evaluation or delivery is executed finally (task stage T7).

Further, the processing step S101, the processing step S103, the processing step S105 correspond to an operation of a part model information transmitting portion. Further, the processing step S201, the processing step S203, the processing step S205 correspond to an operation of a part model information acquiring portion. Further, the processing step S202, the processing step S204, the processing step S206 correspond to an operation of a request transmitting portion. Further, the processing step S102, the processing step S104, the processing step S106 correspond to an operation of a request receiving portion.

In this way, according to the embodiment of the invention, the specification of the die can be formed by acquiring the information with regard to the first part model by accessing to the exclusive server 3 from the die design terminal 2. Further, the concept drawing of the die can be formed by acquiring the information with regard to the second part model by accessing to the exclusive server 3 from the die design terminal 2. Further, the die dividing drawing of the die can be formed by acquiring the information with regard to the third part model by making access to the exclusive server 3 from the die design terminal 2. That is, forming the specification of the die, forming the concept drawing, forming the die dividing drawing can be progressed without awaiting for completing all of the respective part models for designing the die. Therefore, the task of designing the part and the task of designing the die are synchronized to promote a task efficiency.

Further, according to the embodiment of the invention, the requests for the respective part models are transmitted to the part design terminal 1 from the die design terminal 2 through the exclusive server 3 or directly. Further, the request is received from the part design terminal 1 by accessing to the exclusive server 3 or directly. Therefore, in designing the part, the respective part models can be modified by instantly inputting the request with regard to the die design. Therefore, the task efficiency is further promoted.

Further, instead of storing the part model information 3*a* to the exclusive server, the part model information 3*a* may be stored to a record medium of DVD or the like to be provided for the die design task.

Although an explanation has been given of the invention in details and in reference to the specific embodiment, it is apparent for the skilled person that the invention can variously be changed or modified without deviating from the spirit and the range of the invention.

The application is based on Japanese Patent Application (Japanese Patent Application No. 2004-348133) filed on Dec. 1, 2004, and a content thereof is incorporated herein by a reference.

INDUSTRIAL APPLICABILITY

According to the invention, at respective times of finishing the respective part models formed in steps for designing the part, the information with regard to the finished respective part models is transmitted from the part design terminal 1 to the exclusive server 3. Further, the information with regard to the respective part models is acquired by making access to the exclusive server 3 from the die design terminal 2. Therefore, the tasks with regard to the die design can be progressed in parallel based on the acquired information without awaiting for all of the respective part models in order to design the die. Therefore, the part design task and the die design task are synchronized to promote a task efficiency.

The invention claimed is:

1. A synchronizing system for synchronizing a task of designing a part and a task of designing a die in correspondence with the part, the synchronizing system comprising:
    a part design terminal for designing the part;
    a die design terminal for designing the die; and
    a server communicatably connected to the part design terminal and the die design terminal,
    wherein the part design terminal includes a part model information transmitting portion which transmits information with regard to each finished part model to the server at each time of finishing the part model at one finishing stage among a plurality of the finishing stages of designing the die; and
    wherein the die design terminal includes a part model information acquiring portion which acquires the information with regard to the each part model from the server,
    wherein a subsequent finished part model includes more details than a previous finished part model,
    wherein information regarding the previous finished part model is transmitted to the server prior to the generation of the subsequent finished part model,
    wherein the information with regard to the each part model includes information with regard to a first part model required at a stage of forming a specification of the die, information with regard to a second part model required at a stage of forming a concept drawing of the die, and information with regard to a third part model required at a stage of forming a die dividing drawing of the die, and
    wherein the first part model is transmitted to the server before the second part model is generated, and the second part model is transmitted to the server before the third part model is generated.

2. The synchronizing system according to claim 1, wherein the die design terminal further includes a request transmitting portion which directly transmits a request about at least one of the first part model, the second part model and the third part model to the part design terminal through the server or a communication network; and
    wherein the part design terminal further includes a request receiving portion which directly receives the request through the exclusive server or the communication network.

3. The synchronizing system according to claim 1, wherein the subsequent finished part model is transmitted only once there are no requests to change the previous part model.

4. The synchronizing system according to claim 1, wherein the specification of the die are generated from the first part model without using another die specification and wherein the specification comprises a description of a functionality of the part.

5. A server used for synchronizing a task of designing a predetermined part and a task of designing a die in correspondence with the part, wherein the server is communicatably connected to a part design terminal for designing the part and a die design terminal for designing the die, the server comprising:
a receiving portion which receives information with regard to each finished part model transmitted from the part design terminal at each time of finishing the part model at one finishing stage among a plurality of the finishing stages of designing the part;
a storing portion which stores information with regard to the each received part model; and
a transmitting portion which reads the information with regard to the each part model from the storing portion and transmits the information to the die design terminal,
wherein a subsequent finished part model includes more details than a previous finished part model,
wherein information regarding the previous finished part model is received by the receiving portion of the server prior to the generation of the subsequent finished part model,
wherein the information with regard to the each part model includes information with regard to a first part model required at a stage of forming a specification of the die, information with regard to a second part model required at a stage of forming a concept drawing of the die., and information with regard to a third part model required at a stage of forming a die dividing drawing of the die, and
wherein the first part model is transmitted to the server before the second part model is generated, and the second part model is transmitted to the server before the third part model is generated.

6. The server according to claim 5, wherein the subsequent finished part model is received only once there are no requests to change the previous part model.

7. A part design terminal apparatus for designing a part used for synchronizing a task of designing the part and a task of designing a die in correspondence with the part, the part design terminal apparatus comprising:
a transmitting portion which generates information with regard to each finished part model at each time of finishing the part model at one finishing stage among a plurality of the finishing stages of designing the part and transmits the information to a side of a die design terminal,
wherein a subsequent finished part model includes more details than a previous finished part model,
wherein information regarding the previous finished part model is transmitted to the side of the die design terminal prior to the generation of the subsequent finished part model,
wherein the information with regard to the each part model includes information with regard to a first part model required at a stage of forming a specification of the die, information with regard to a second part model required at a stage of forming a concept drawing of the die, and information with regard to a third part model required at a stage of forming a die dividing drawing of the die, and
wherein the first part model is transmitted to the side of the die design terminal before the second part model is generated, and the second part model is transmitted to the side of the die design terminal before the third part model is generated.

8. The part design terminal apparatus according to claim 7, wherein the subsequent finished part model is transmitted only once there are no requests to change the previous part model.

9. A die design terminal apparatus for designing a die used for synchronizing a task of designing a part and a task of designing the die in correspondence with the part, the die design terminal apparatus comprising:
an acquiring portion which acquires information with regard to each finished part model generated at a side of a part design terminal at each time of finishing a part model of one finishing stage among a plurality of the finishing stages of designing the part,
wherein a subsequent finished part model includes more details than a previous finished part model, and
wherein information regarding the previous finished part model is acquired by the acquiring portion of the die design terminal prior to the generation of the subsequent finished part model,
wherein the information with regard to the each part model includes information with regand to a first art model required at a stage of forming a specification of the die, information with regard to a second part model required at a stage of forming a concept drawing of the die, and information with regard to a third part model required at a stage of forming a die dividing drawing of the die, and
wherein the first part model is acquired by the acquiring portion of the die design terminal before the second part model is generated, and the second part model is acquired by the acquiring portion of the die design terminal before the third part model is generated.

10. The die design terminal apparatus according to claim 9, wherein the subsequent finished part model is acquired only once there are no requests to change the previous part model.

11. A process of synchronizing a task of designing a part and a task of designing a die in correspondence with the part comprising the steps of:
providing a part design terminal apparatus and a die design terminal apparatus;
generating a previous finished part model using the part design terminal apparatus;
delivering the previous finished part model to the die design terminal apparatus;
after the previous finished part model has been delivered to the die design terminal apparatus, generating a subsequent finished part model which has more details than the previous finished part model using the part design terminal apparatus; and
delivering the subsequent finished part model to the die design terminal apparatus,
wherein the previous finished part model includes a first part model required at a stage of forming a specification of the die, a second part model required at a stage of forming a concept drawing of the die, and a third part model required at a stage of forming a die dividing drawing of the die, and
wherein the first part model is delivered to the die design terminal apparatus before the second part model is generated, and the second part model is delivered to the die design terminal apparatus before the third part model is generated.

12. The process according to claim 10, wherein the subsequent finished part model is delivered only once there are no requests to change the previous part model.

* * * * *